Patented Aug. 24, 1937

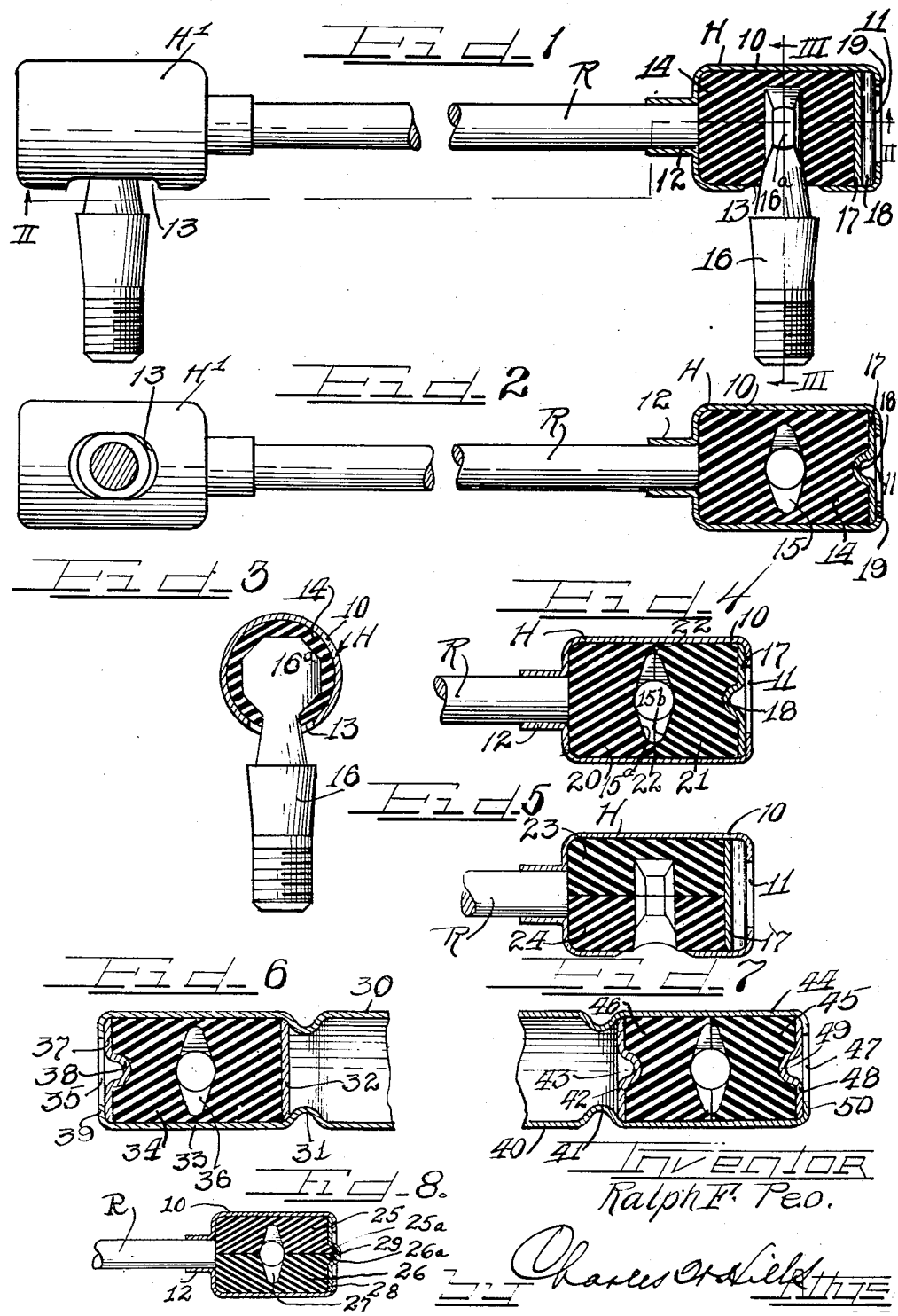

2,091,103

UNITED STATES PATENT OFFICE 2,091,103

LINK

Ralph F. Peo, Buffalo, N. Y., assignor to Houde Engineering Corporation, Buffalo, N. Y., a corporation of New York Application August 28, 1935, Serial No. 38,205

5 Claims. (Cl. 287—85)

This invention relates to links particularly adapted for use on automotive vehicles to connect the axle with the lever arm of a shock absorber mounted on the vehicle chassis.

More specifically this invention relates to connecting links of the type in which housings at the end of a member contain bushings of resilient material such as rubber in which studs are embedded so as to form a resilient noiseless joint which does not require lubrication nor adjustment and in which relative movement between the stud and housing therefor is permitted by inter particle flow of the resilient bushing.

In accordance with this invention means are provided in the housing for preventing displacement of the bushing during use of the joint.

An important object of this invention is to provide a link having one or more housings formed at the ends thereof for resilient bushings adapted to receive the heads of studs in which the housings are provided with means for preventing displacement of the resilient bushings.

Another object of this invention is to provide a link having a housing formed at an end thereof for receiving a resilient bushing provided with a cavity to seat the head of a stud and in which the housing has a closure plate provided with means for maintaining the resilient bushing in proper alignment in the housing.

A further object of this invention is to provide a link construction in which one or more housings are formed to receive resilient bushings which seat the heads of connecting studs and to provide an inturned projection on closure plates for the housing to prevent displacement of the bushing therein and to maintain the bushing in proper alignment.

A further object of this invention is to provide links in which housings are formed with elongated openings in the sides thereof for receiving therethrough the heads of connecting studs and rubber bushings are disposed in the housing with cavities at an angle to the long axis of the openings in the housing for seating the stud heads, together with closure plates for the housing cooperating with the rubber bushing to maintain the cavities thereof in proper alignment with the side openings in the housing.

Another object of this invention is to prevent displacement of rubber bushings in the housings of link constructions.

A further object of this invention is to provide a simplified link construction adapted to use a split or single molded rubber bushing for seating stud heads without permitting the bushings to become displaced during use of the link.

Other and further objects of this invention will become apparent to those skilled in the art from the following detailed description of the annexed sheet of drawings which discloses preferred embodiments of the invention.

On the drawing:

Figure 1 is a side elevational view of a form of link according to this invention showing one of the housings of the link in vertical cross section.

Figure 2 is a cross sectional view, with parts shown in elevation, taken substantially along the line II—II of Fig. 1.

Figure 3 is a cross sectional view, with parts in elevation, taken substantially along the line III—III of Fig. 1.

Figure 4 is a fragmentary cross sectional view of the link disclosed in Figs. 1 to 3 but having a split or two-piece rubber bushing therein in place of the single rubber bushing.

Figure 5 is a fragmentary cross sectional view of the type of link shown in Figs. 1 to 3 in which another form of split or two-piece rubber bushing is used.

Figure 6 is a fragmentary cross sectional view of a modified form of link according to this invention in which a hollow tubular member is used to form the housing and the intermediate connecting portion of the link.

Figure 7 is another fragmentary cross sectional view of a form of link according to this invention using a hollow tube for both the housing and the connecting portion of the link and having a split or two-piece rubber bushing therein, together with retaining means for the bushing.

Figure 8 is a fragmentary cross sectional view, with a part in elevation, illustrating another modification of the joints of this invention.

As shown on the drawing:

The modification of link, according to this invention, shown in Figs. 1 to 5 of the drawing, comprises heads H and H' and a rod or shank R secured to and connecting the heads. Each head comprises a housing body 10 in the form of an elongated cylinder having an open end 11 at one end thereof and a reduced collar portion 12 extending from the other end thereof. An elongated opening 13 is formed in the side wall of the housing 10 intermediate the ends thereof. The opening 13 has the long axis thereof extending axially of the housing.

The collar 12 of the head receives the ends of the rod R which ends extend flush with the end of the housing body. The rod may be welded, or brazed to the collar 12.

As shown in Figs. 1 to 3, a molded rubber bushing 14 is seated in the housing body 10. The bushing 14 has a cavity 15 formed therein for receiving the head 16a of a stud 16. The stud head 16a is preferably polygonal in contour as shown in Fig. 3 and oval in cross section as indicated in Fig. 2. The diameter of the stud head 16a is slightly less than the long axis of the side opening 13 in the housing but is substantially greater than the small axis of the opening so that when the stud head is inserted through the opening and rotated 90° to be seated in the cavity 15 of the rubber bushing 14, it is locked in the housing and cannot be removed during use of the joint.

The open end 11 of the housing 10 is closed by a closure plate 17 which is a disc-like metal member adapted to fit snugly within the housing and is provided with an inturned lip 18 extending transversely across the center thereof for fitting into a groove of the corresponding shape formed in the end of the rubber bushing 14.

The closure plate 17 is secured in the housing by spinning down the end walls of the housing as at 19 thereby forming an inturned flange and rigidly securing the closure plate 17 in position. The inturned lip 18 of the closure plate prevents rotation of the rubber bushing 14 and maintains the cavity of the bushing in proper alignment with the opening 13 of the housing.

Relative movement between the stud 16 and the head H of the link is thus permitted only by inter particle flow of the rubber bushing 14 and no frictional wearing away can occur between the stud head 16a and the walls of the cavity within the bushing or between the outer surfaces of the bushing 14 and the inner walls of a housing 10. The spinning down operation secures the closure plate 17 in position and prevents rotation of the plate relative to the housing.

The cavity 15 within the bushing is molded to snugly fit the head 16a of the stud and has its long diameter preferably at right angles to the long axis of the elongated opening 13.

In Fig. 4 the housing H is formed in identical manner with the housings described in Figs. 1 to 3 and thus has a free open end 11, a reduced neck or collar portion 12 and an elongated opening formed in the side wall thereof for receiving the head 16a of a stud member. However, in the modification shown in Fig. 4, two rubber bushings 20 and 21 are used in place of the single rubber bushing 14. The rubber bushing 20 is formed to fit the inner half of the housing 10 and is molded to provide a seat 15a for half of the stud head 16a. The other rubber bushing 21 is molded to provide a groove therein for receiving the inturned lip 18 of the closure plate 17 and is also provided with a molded hollow 15b to receive the other half of the stud head 16a. The bushings 20 and 21 may be considered as a slit bushing which is divided transversely of the axis of the housing. The two bushings 20 and 21 are compressed together as at 22 and the inturned lip 18 of the closure plate member, by holding the bushing 21 in position also holds the bushing 20 in position due to compression between the bushings at 22.

In Fig. 5 another form of split bushing is shown in the housing 10 in which the bushing comprises two rubber blocks 23 and 24 extending axially of the housing. Each bushing 23 and 24 has formed at one end thereof a groove for receiving the inturned lip 18 of the closure plate and each rubber member 23 and 24 has a cavity for receiving half of the stud head 16a.

In Fig. 8, still another form of split bushing is shown in the housing 10. In this modification the bushing comprises two rubber blocks 25 and 26 extending axially of the housing but having the split or line of contact at right angles to the line of contact of the rubber blocks 23 and 24 (Fig. 5). The blocks 25 and 26 together define a cavity 27 for receiving a stud head such as 16a. Each block 25 and 26 has a rounded extension 25a and 26a along one end thereof along the line of contact of the blocks and defining together a semi-cylindrical ridge across the end of the bushing. A closure plate 28 for the housing 10, similar to the plates 17 defined above but in reversed position with the grooved portion 29 extending outwardly from the housing for receiving the ridge of the bushing is spun into the housing as indicated in the drawing and described above. The bushing is thus locked against rotation relative to the housing.

It should therefore be understood from Figs. 1 to 5 and 8 that the rubber bushing may be formed in one piece as shown in Figs. 1 to 3 or may be formed as two rubber blocks divided transversely of the axis of the housing as shown in Fig. 4 or may be formed as two rubber blocks divided axially of the housing along two different planes as shown in Figs. 5 and 8. The locking of the bushing against rotation relative to the housing is accomplished by forming a recessed groove or an extending ridge along one end of the bushing to receive or be seated in a complementarily shaped ridge or groove in a closure plate.

In Fig. 6 there is shown another modification of link according to this invention in which a hollow tubular member 30 is stamped near each end thereof to provide an inturned annular bead 31. A circular metal disk 32 is seated against the bead 31 in the tube 30 to form the bottom of a housing 33 containing a rubber bushing 34. The end of the tube 30 forming the housing 33 is open as shown at 35 and the side of the housing 33 is provided with an elongated opening (not shown) such as the opening 13 described in Figs. 1 to 5 for receiving therethrough the head of a stud member. The bushing 34 is provided with a cavity 36 for seating the head of the stud member in the same manner in which the head 16a of the stud member is seated in the link described in Figs. 1 to 3.

The open end of the housing 33 is closed with a closure plate 37 adapted to snugly fit within the housing. The closure plate 37 has an inturned lip 38 seated in a groove formed in the end of the bushing 34. The closure plate 37 is secured in the housing by spinning down the end of the housing walls as shown at 39 to form an inturned flange which securely holds the closure plate 37 in position.

Since the closure plate 37 cannot move relative to the housing 33, the lip 38 of the closure plate holds the bushing 34 against rotation relative to the housing and maintains the cavity 36 in the bushing in proper alignment with the opening in the side walls of the housing.

The form of link disclosed in Fig. 6 can be made from a single piece of hollow tubing and the portion of the tube intermediate the inturned bead 31 forms the connecting rod. With this construction it is not necessary to use a separate rod such as the rod "R" shown in Figs. 1 to 5.

In Fig. 7 there is shown a modification of the link structure shown in Fig. 6 adapted for use with a slit rubber bushing of the type comprising two rubber blocks contacting each other along a line at right angles to the axis of the housing.

In Fig. 7 a tube 40 similar to the tube 30 shown in Fig. 6 is provided intermediate its ends with an inturned groove 41. A plate 42 is seated against the groove 41 and is provided with an inturned lip 43. The plate 42 separates the end of the tube 40 from the intermediate portion and serves to define a housing 44 for receiving rubber blocks 45 and 46 therein. The side wall of the housing is provided with an elongated opening similar to the openings 13 described in Figs. 1 to 5. The end of the housing is open as shown at 47. A closure plate 48 serves to seal the open end of the housing in the same manner in which the closure plate 17 seals the housing 10 described in Figs. 1 to 5. The closure plate 48 is provided with an inturned lip 49 for seating in a groove formed in the bushing 45.

This modification illustrates how a split rubber bushing may be used in a tubular form of link according to this invention and two retaining plates are used to hold the two rubber blocks forming the bushing in position to maintain proper alignment of the cavities formed in the rubber blocks with the opening in the side wall of the housing.

The plates 42 and 48 are held fixedly with respect to the tube 40 by assembling the joint element as shown in Fig. 7 and then spinning down the tube 40 as shown at 41 to clamp the member 42 in position and as shown at 50 to clamp the member 48 in position. In this manner both of the rubber blocks 45 and 46 are held in proper alignment within the housing 44 so that the cavity which they define for the stud head 16a is in proper alignment with the side opening in the housing 44.

The link of this invention therefore can be formed either from a tube or from separate housing members interconnected by a rod or shank portion. The housings of the link are closed by closure plates provided with inturned portions for preventing rotation of the rubber bushing in the housing relative thereto. The stud heads are locked in the housing by insertion through the side opening in the housing and rotation through an angle to seat in the cavity formed in the rubber bushing which cavity is formed to fit the head of the stud and has its long axis at an angle to the long axis of the opening in the housing. Thus after the stud head has been seated in the bushing, it is impossible to remove the same without disassembly of the joint structure.

Having now described my invention I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A link comprising a housing having a side opening for receiving the head of a stud therethrough, a bushing of resilient material in said housing having a cavity formed therein for receiving the stud head, means for closing the housing and for compressing the bushing having an inturned portion to prevent rotation of the bushing and means for securing said closure means fixedly in the housing.

2. A link comprising a tubular housing having an open end and an elongated side opening, a bushing of resilient material compressed in said housing and having a narrow cavity formed therein in alignment with the side opening of the housing, said cavity having the long axis thereof at an angle to the long axis of said side opening, said bushing having a groove formed in one end thereof, a circular metal disk in the open end of said housing having an inturned lip seated in said groove of the bushing and means for securing said disk fixedly with respect to the housing for maintaining the cavity of the bushing in proper alignment with the side opening of the housing.

3. A link comprising a housing having a free open end and an elongated side opening therein, a pair of rubber blocks in said housing, said rubber blocks together forming a cavity in alignment with the side opening in the housing, a closure plate for said housing having an inturned projection cooperating with both of the rubber blocks to prevent relative movement between the blocks and the housing and means for fixedly securing said closure plate to said housing.

4. A link comprising a housing having a resilient bushing therein defining a cavity for receiving the head of a stud, said bushing having an extending ridge formed across one end thereof, a closure plate for said housing having a recessed portion for receiving the ridge of said bushing and means securing said plate to the housing whereby relative rotation between the bushing and housing is prevented.

5. A joint comprising a housing having open ends and an elongated side opening, a stud extending through said side opening and having a headed portion in said housing, rubber bushings in said housing abutting each side of said headed portion, closure plates for the open ends of said housing for compressing the rubber bushings therein against the headed portion of the stud, said closure plates having means cooperating with the rubber bushings to prevent relative movement between the bushings and the housing, and means for fixedly securing said closure plates to the housing.

RALPH F. PEO.